(12) United States Patent
Kung

(10) Patent No.: US 11,825,280 B2
(45) Date of Patent: Nov. 21, 2023

(54) MULTI-MODE WIRELESS MICROPHONE APPARATUS

(71) Applicant: Chiayo Electronics Co., Ltd., Chiayi (TW)

(72) Inventor: Te-Wei Kung, Chiayi (TW)

(73) Assignee: Chiayo Electronics Co., Ltd., Chiayi (TW)

( * ) Notice: Subject to any disclaimer, the term of this patent is extended or adjusted under 35 U.S.C. 154(b) by 58 days.

(21) Appl. No.: 17/690,102

(22) Filed: Mar. 9, 2022

(65) Prior Publication Data

US 2023/0292043 A1 Sep. 14, 2023

(51) Int. Cl.
| | |
|---|---|
| *H04R 1/10* | (2006.01) |
| *H04R 3/00* | (2006.01) |
| *G06F 3/16* | (2006.01) |
| *H04R 1/40* | (2006.01) |
| *G10K 11/16* | (2006.01) |

(52) U.S. Cl.
CPC ............. *H04R 3/005* (2013.01); *G06F 3/165* (2013.01); *H04R 1/1016* (2013.01); *H04R 1/1041* (2013.01); *H04R 1/406* (2013.01); *H04R 2420/07* (2013.01); *H04R 2430/01* (2013.01)

(58) Field of Classification Search
CPC .... H04R 3/005; H04R 1/1016; H04R 1/1041; H04R 1/406; H04R 2420/07; H04R 2430/01; G06F 3/165
USPC .................................................... 381/74, 71.1
See application file for complete search history.

(56) References Cited

U.S. PATENT DOCUMENTS

2007/0149246 A1* 6/2007 Bodley .................. H04R 3/005
455/556.1

* cited by examiner

*Primary Examiner* — Ammar T Hamid

(57) ABSTRACT

A wireless microphone apparatus includes a wireless microphone, a wireless receiver, an external earphone microphone, an external earphone, and a recording device. The wireless microphone includes a transmission and reception circuit. The wireless receiver includes external earphone microphone volume control circuit, a reception and transmission circuit, and an output port. The external earphone microphone is connected with the wireless receiver. The external earphone is connected with the wireless microphone. After the output port is electrically connected with the recording device, the wireless microphone provides a sound reception function, and the external earphone microphone volume control circuit of the wireless receiver controls an audio signal of the external earphone microphone to be supplied to the recording device simultaneously.

2 Claims, 6 Drawing Sheets

MULTI-MODE WIRELESS MICROPHONE APPARATUS

BACKGROUND OF THE INVENTION

1. Field of the Invention

The present invention relates to a microphone apparatus and, more particularly, to a multi-mode wireless microphone apparatus.

2. Description of the Related Art

With more and more functions of mobile phones and the development of various software and programs, many users have become Internet celebrities who have become live broadcasters. However, when employing programs such as YouTube or the like, it is necessary to use a video recording device, such as a smart phone, a digital camera, a video camera or the like. What is the most important is to use a wireless microphone to receive an audio signal with the best quality. A conventional wireless microphone device includes wireless microphone, and a wireless receiver. The wireless receiver is connected with the video and audio equipment. Thus, the host (such as an Internet celebrity, a live broadcaster or the like) uses the wireless microphone to control the audience. However, many situations are found, including the audio and video are out of sync, there is no sound, a lot of noise occurs, or the host suddenly forgets the words, among other problems. The main reason is that the audio signal transmitted by the wireless microphone to the wireless receiver is not monitored synchronously, so that when there is a problem with the audio source signal, it cannot be monitored. In addition, when the host suddenly forgets the words, it is extremely important for an assistant or a second person to provide access prompts or hints.

BRIEF SUMMARY OF THE INVENTION

In accordance with the present invention, there is provided a wireless microphone apparatus comprising a wireless microphone, a wireless receiver, an external earphone microphone, an external earphone, and a recording device. The wireless microphone includes a button control circuit and a transmission and reception circuit. The wireless receiver includes an external earphone microphone volume control circuit, an output port, and a reception and transmission circuit. The output port is electrically connected with the recording device to connect the wireless microphone with the recording device. The external earphone microphone is connected with the wireless receiver. After the output port is electrically connected with the recording device, the wireless microphone provides a sound reception function, the external earphone microphone monitors a quality of an audio signal of the wireless microphone simultaneously, and the external earphone microphone volume control circuit of the wireless receiver controls an audio signal of the external earphone microphone to be supplied to the recording device simultaneously. The external earphone is connected with the wireless microphone. The button control circuit of the wireless microphone and the wireless receiver start a duplex transmission function. The external earphone receives the audio signal of the external earphone microphone. After the external earphone is connected with the wireless microphone, and after the button control circuit of the wireless microphone and the wireless receiver start a duplex transmission function, the external earphone of the wireless microphone receives the audio signal of the external earphone microphone of the wireless receiver.

Preferably, the wireless receiver further includes a three-step noise reduction circuit, a recording volume control circuit, and an audio circuit. The wireless receiver receives the audio signal of the wireless microphone, and the audio signal of the wireless microphone is processed by the three-step noise reduction circuit, the recording volume control circuit, and the audio circuit, and is supplied to the recording device.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
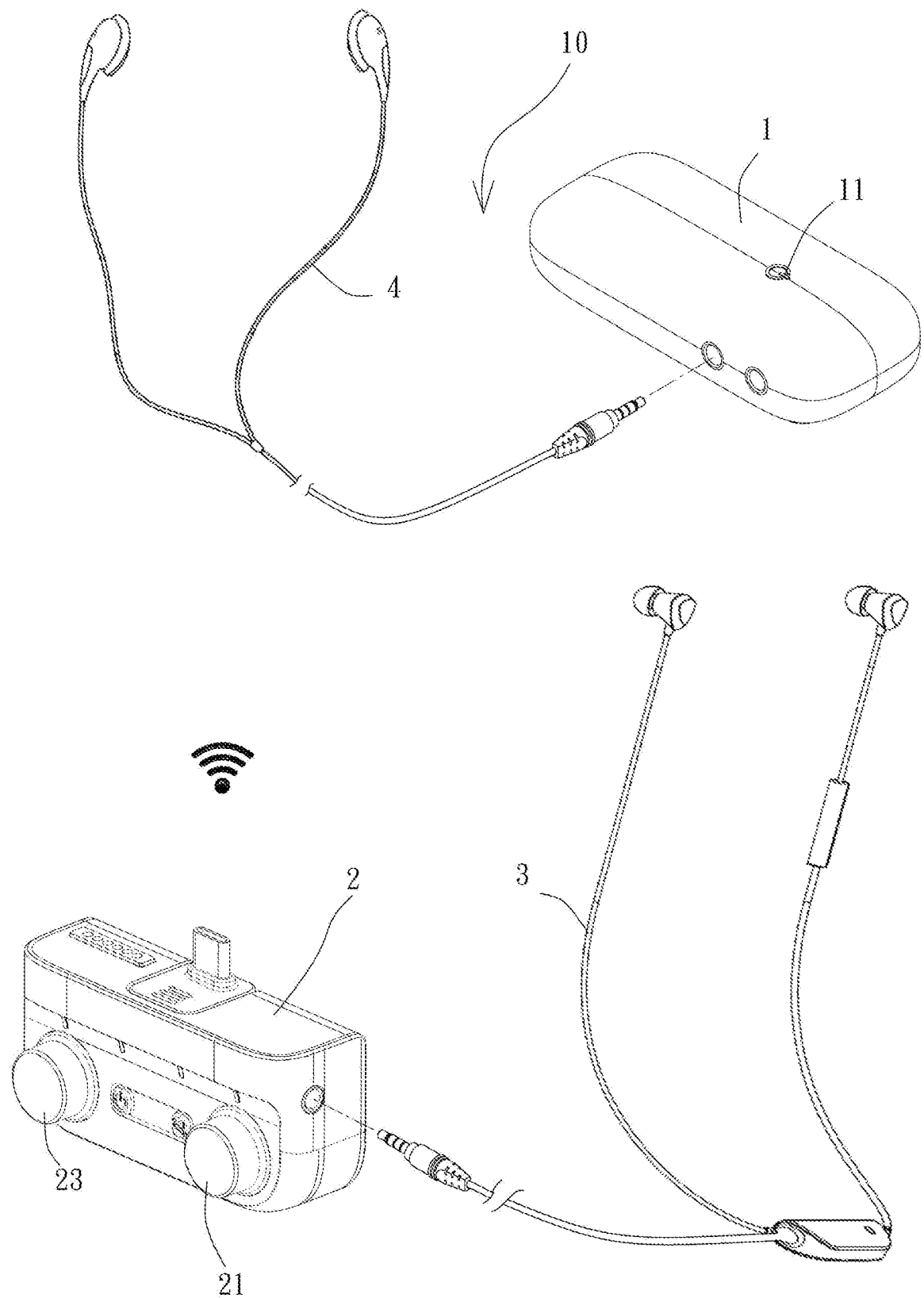
FIG. 1 is an exploded perspective view of a wireless microphone apparatus in accordance with the preferred embodiment of the present invention.
Figure 2:
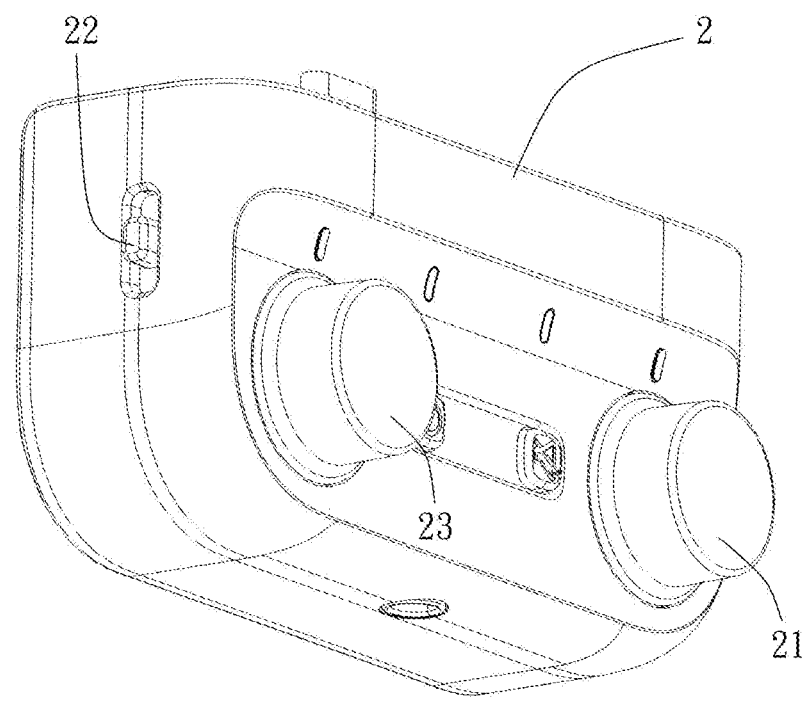
FIG. 2 is a perspective view of a wireless receiver of the wireless microphone apparatus in accordance with the preferred embodiment of the present invention.
Figure 3:
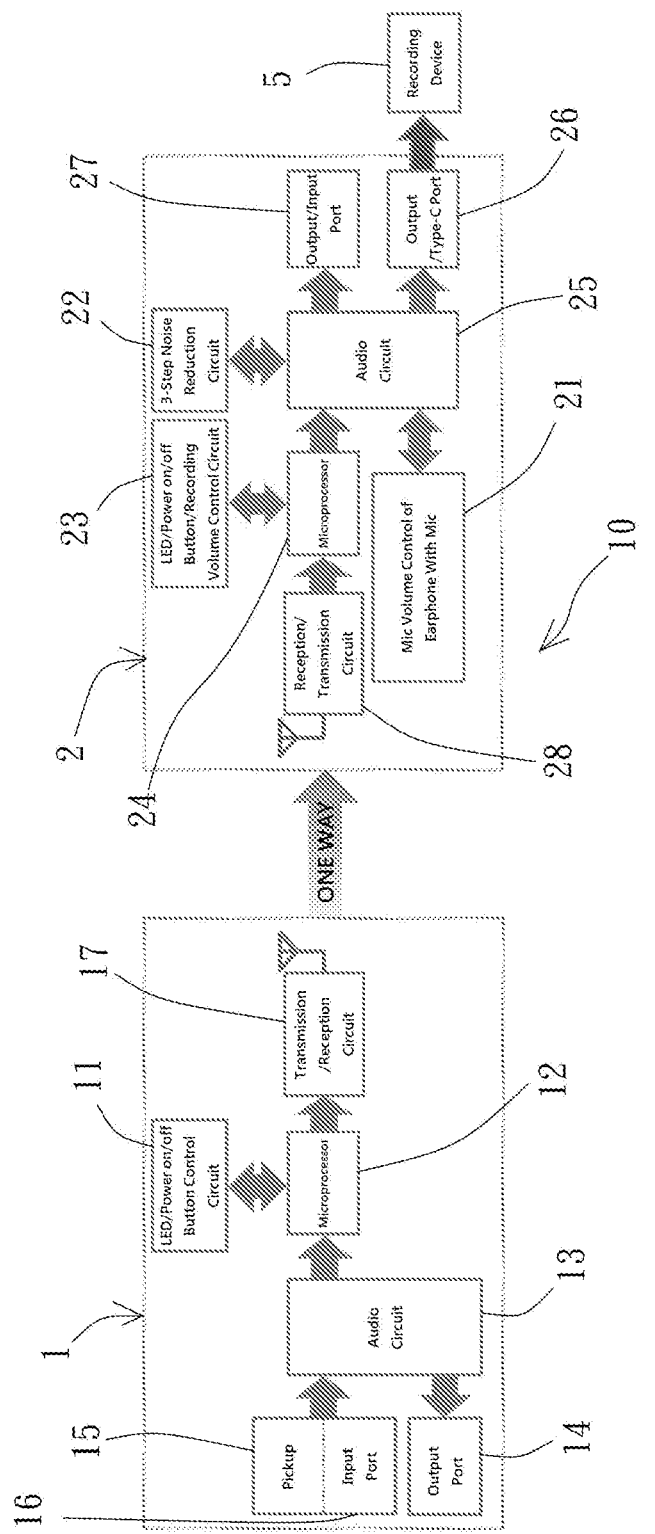
FIG. 3 is a block diagram showing a first mode of the wireless receiver of the wireless microphone apparatus in accordance with the preferred embodiment of the present invention.

Referring to the drawings and initially to FIGS. 1-3, a multi-mode wireless microphone apparatus 10 in accordance with the preferred embodiment of the present invention comprises a wireless microphone 1, a wireless receiver 2, an external earphone microphone (or earpiece) 3, an external earphone (or earpiece) 4, and a recording device 5.

The wireless microphone 1 includes a button control circuit 11, a microprocessor 12, an audio circuit 13, an output port 14, a pickup module 15, an input port 16, and a transmission and reception circuit 17. The button control circuit 11 includes an LED power on/off module.

The wireless receiver 2 includes an external earphone microphone volume control circuit 21, a three-step noise reduction circuit 22, a recording volume control circuit 23, a microprocessor 24, an audio circuit 25, an output port 26, an output and input port 27, and a reception and transmission circuit 28. The external earphone microphone volume control circuit 21 is used to control and regulate the microphone volume of the external earphone microphone 3. The three-step noise reduction circuit 22 is an active hardware noise reduction circuit. The recording volume control circuit 23 includes an LED power on/off module. The output port 26 is a type-C port. The output port 26 is electrically connected with the recording device 5.

The external earphone microphone 3 is an earphone with a microphone. The external earphone microphone 3 is connected with the wireless receiver 2. The external earphone 4 is connected with the wireless microphone 1. The recording device 5 has a video recording function.

Figure 6:
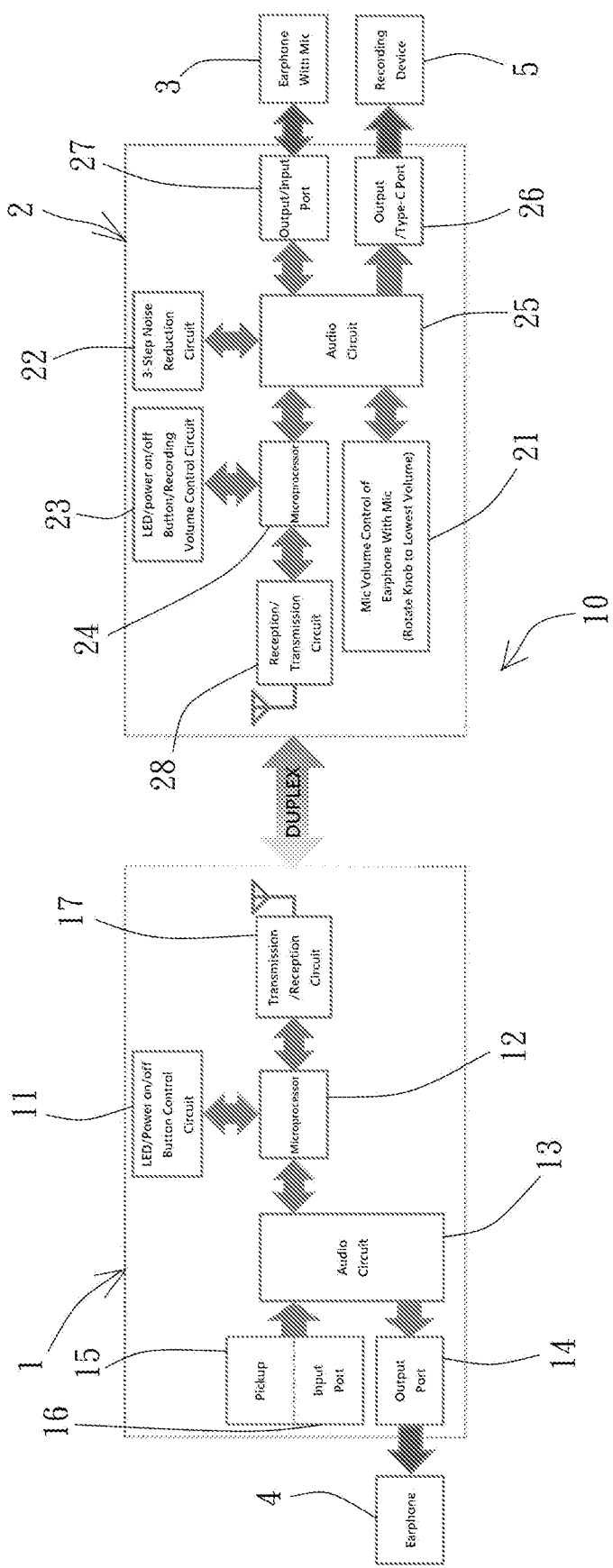
FIG. 6 is a block diagram showing a fourth mode of the wireless receiver of the wireless microphone apparatus in accordance with the preferred embodiment of the present invention.

In practice, after the output port 26 of the wireless receiver 2 is electrically connected with the recording device 5, the wireless microphone 1 provides a sound reception function, and the external earphone microphone volume control circuit 21 of the wireless receiver 2 controls an audio signal (from the wireless microphone 1 or the external earphone microphone 3) that is supplied to the recording device 5 simultaneously as shown in FIG. 6. In addition, after the wireless microphone 1 is connected with the external earphone 4 as shown in FIG. 6, the button control circuit 11 of the wireless microphone 1 and the wireless receiver 2 are operated to start a duplex (or two-way) transmission function. In the preferred embodiment of the present invention, after the button control circuit 11 is turned on and started, the power on/off button of the button control circuit 11 is pressed during a long time to start the duplex transmission function. Thus, the external earphone 4 is connected with the audio signal of the external earphone microphone 3 as shown in FIG. 6 so that the external earphone 4 receives the audio signal of the external earphone microphone 3.

In addition, after the wireless receiver 2 receives the audio signal of the wireless microphone 1, the audio signal is processed by the microprocessor 24, the three-step noise reduction circuit 22, the recording volume control circuit 23, and the audio circuit 25, and is transmitted to the recording device 5 through the output port 26 as shown in FIG. 3.

Alternatively, the external earphone microphone volume control circuit 21, the audio circuit 25, the output and input port 27, and the external earphone microphone 3 perform a duplex transmission as shown in FIG. 6 so that the external earphone microphone volume control circuit 21 is connected with the external earphone microphone 3. Thus, the external earphone microphone volume control circuit 21 of the wireless receiver 2 is used to control and regulate the magnitude of the audio signal (such as the microphone volume) of the external earphone microphone 3.

At the same time, the external earphone microphone volume control circuit 21 is connected with the recording device 5 through the audio circuit 25 and the output port 26 so that the external earphone microphone volume control circuit 21 of the wireless receiver 2 also controls the audio signal of the external earphone microphone 3 to be delivered through the output and input port 27, the audio circuit 25, and the output port 26 to the recording device 5 simultaneously as shown in FIG. 6. Thus, the regulation knob of the external earphone microphone volume control circuit 21 is rotated to adjust the volume to the minimum value and to form a turn-off state so that the audio signal of the external earphone microphone 3 will not be transmitted to the recording device 5.

In operation, referring to FIG. 3 with reference to FIGS. 1 and 2, according to a first mode of the multi-mode wireless microphone apparatus 10, the wireless receiver 2 is electrically connected with the recording device 5 through the output port 26. At this time, the wireless microphone 1 and the wireless receiver 2 perform a one-way transmission. In such a manner, the audio signal (such as a voice) received by the pickup module 15 of the wireless microphone 1 is delivered through the audio circuit 13 to the microprocessor 12. Then, the audio signal is processed by the microprocessor 12 and is converted into a digital signal which is transmitted through the transmission and reception circuit 17 into the reception and transmission circuit 28 of the wireless receiver 2. Then, the digital signal is delivered through and processed by the microprocessor 24, the three-step noise reduction circuit 22, the recording volume control circuit 23, and the audio circuit 25, and is transmitted through the output port 26 to the recording device 5 as shown in FIG. 3.

Figure 4:
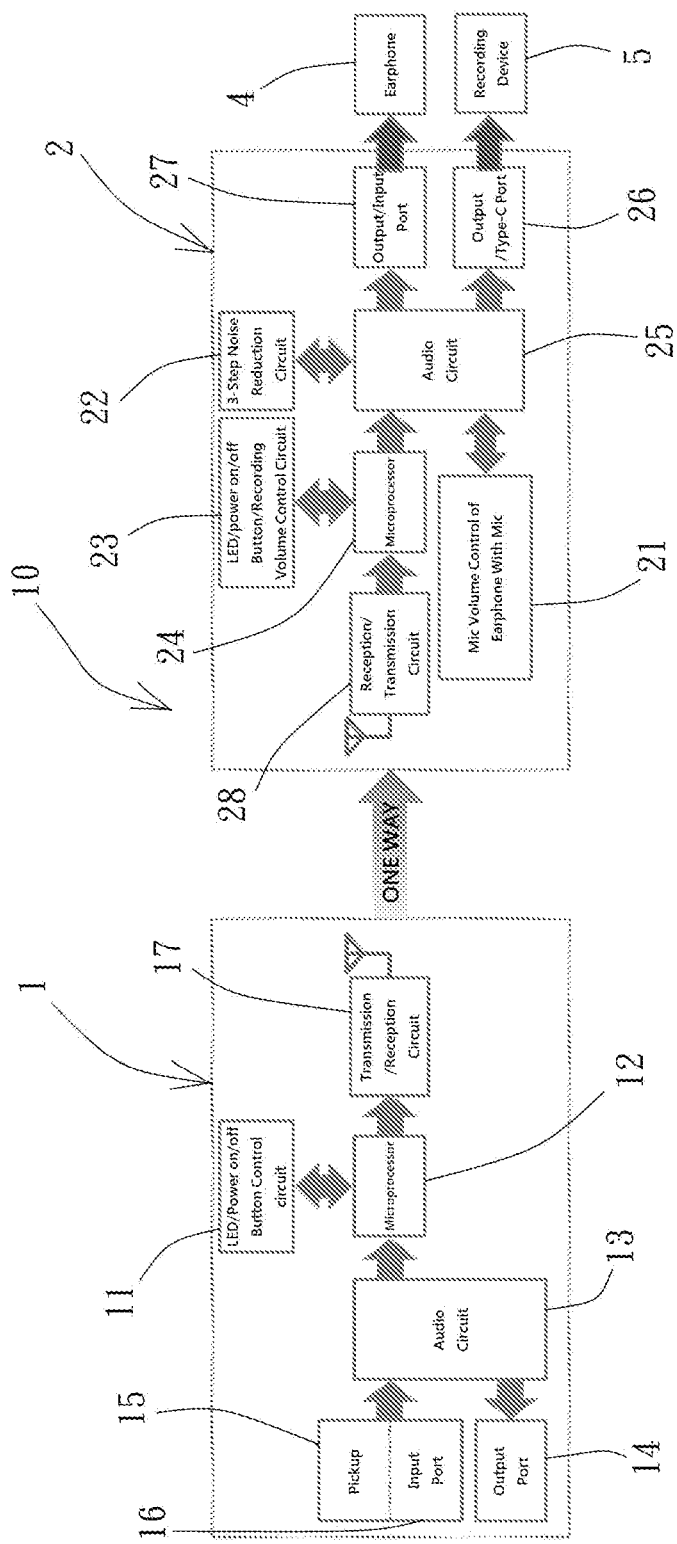
FIG. 4 is a block diagram showing a second mode of the wireless receiver of the wireless microphone apparatus in accordance with the preferred embodiment of the present invention.

Alternatively, referring to FIG. 4 with reference to FIGS. 1-3, according to a second mode of the multi-mode wireless microphone apparatus 10, the wireless receiver 2 is electrically connected with the external earphone 4 through the output and input port 27, and is electrically connected with the recording device 5 through the output port 26. At this time, the wireless microphone 1 and the wireless receiver 2 perform a one-way transmission. In such a manner, the external earphone 4 is used to perform a synchronous monitoring function so as to check the quality of the audio signal of the wireless microphone 1 simultaneously when the recording device 5 is operating. Thus, even when the regulation knob of the external earphone microphone volume control circuit 21 is rotated to turn on the audio circuit 25 inadvertently, the audio signal will not interfere with or interrupt operation of the recording device 5. In addition, the recording volume control circuit 23 has a control knob to control and regulate the recording volume of the recording device 5.

Figure 5:
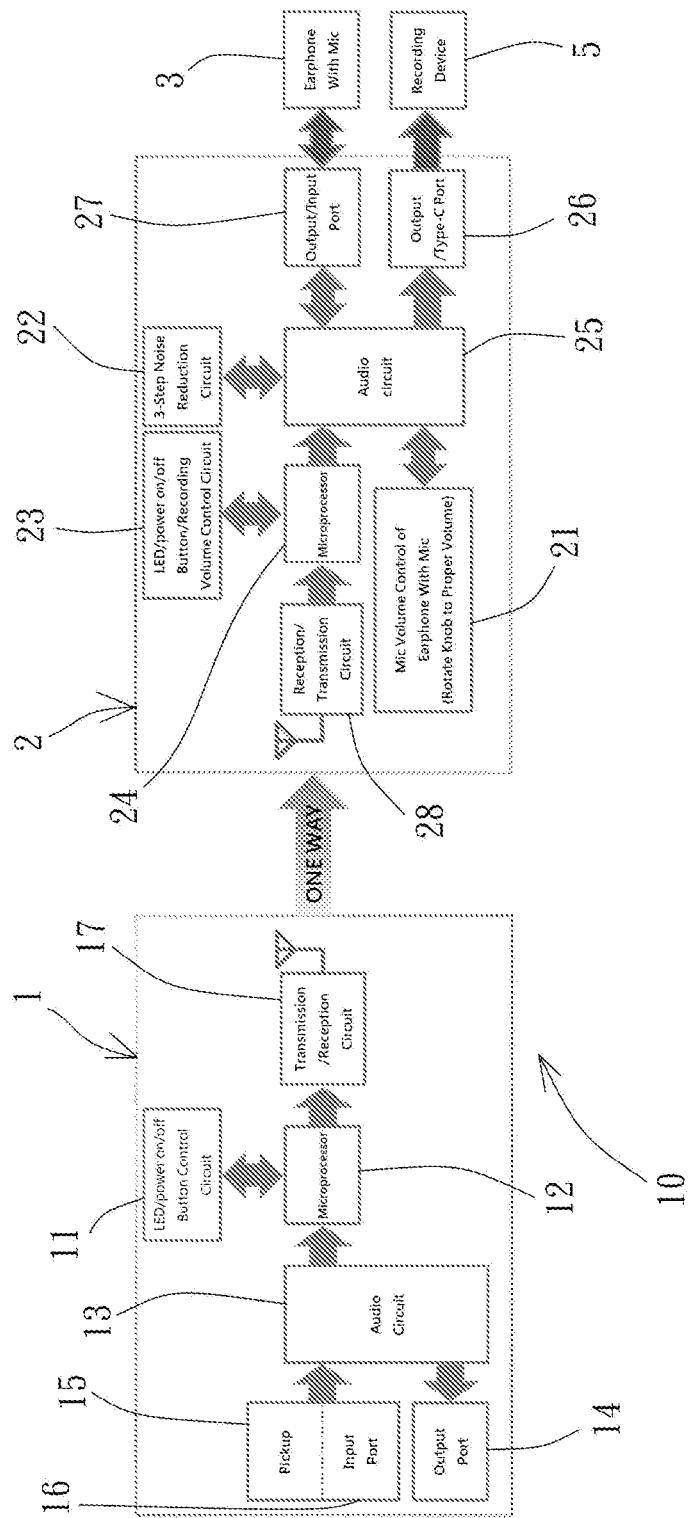
FIG. 5 is a block diagram showing a third mode of the wireless receiver of the wireless microphone apparatus in accordance with the preferred embodiment of the present invention.

Alternatively, referring to FIG. 5 with reference to FIGS. 1-3, according to a third mode of the multi-mode wireless microphone apparatus 10, the wireless receiver 2 is electrically connected with the external earphone microphone 3 through the output and input port 27, and is electrically connected with the recording device 5 through the output port 26. At this time, the wireless microphone 1 and the wireless receiver 2 perform a one-way transmission. In such a manner, the audio signal of the external earphone microphone 3 is supplied to the recording device 5 simultaneously after the external earphone microphone volume control circuit 21 is turned on or started. Thus, the host uses the wireless microphone 1 to master or control the scene or the audience, while the assistant (or a second person) uses the external earphone microphone 3 to assist the host.

Alternatively, referring to FIG. 6 with reference to FIGS. 1-3, according to a fourth mode of the multi-mode wireless microphone apparatus 10, the wireless microphone 1 is electrically connected with the external earphone 4 through the output port 14, and the wireless receiver 2 is electrically connected with the external earphone microphone 3 through the output and input port 27, and is electrically connected with the recording device 5 through the output port 26. At this time, the wireless microphone 1 and the wireless receiver 2 perform a duplex transmission. In such a manner, the external earphone 4 is connected with the external earphone microphone 3 through the wireless microphone 1 and the wireless receiver 2 to start a duplex transmission function, so that the host uses the external earphone 4 and the wireless microphone 1, while the assistant (or a second person) uses the external earphone microphone 3 to assist the host. At this time, the regulation knob of the external earphone microphone volume control circuit 21 is rotated to adjust the volume to the minimum value and to form a turn-off state so that the audio signal of the external earphone microphone 3 will not be transmitted to the recording device 5. Thus, the assistant uses the external earphone microphone 3 to monitor the quality of the audio signal of the wireless microphone 1, and to assist (such as hint or prompt) the host independently through the external earphone 4, so as to facilitate the video recording operation. In addition, when the environmental noise is too large, an external microphone is connected with the wireless microphone 1 through the input port 16 for use with the host.

Accordingly, the wireless receiver 2 receives the audio signal of the wireless microphone 1 and supplies the audio signal to the recording device 5 to perform a normal mode. In addition, when the wireless receiver 2 is electrically connected with the external earphone 4, the external earphone 4 performs a synchronous monitoring function so as to check the quality of the audio signal of the wireless microphone 1 simultaneously when the recording device 5 is operating, to prevent the external earphone microphone volume control circuit 21 from interfering with or interrupting the audio signal. Further, when the wireless receiver 2 is electrically connected with the external earphone microphone 3, the audio signal of the external earphone microphone 3 is supplied to the recording device 5 simultaneously after the external earphone microphone volume control circuit 21 is turned on, so that the host uses the wireless microphone 1, while the assistant uses the external earphone microphone 3 to assist the host. Further, when the wireless microphone 1 is electrically connected with the external earphone 4, and the wireless receiver 2 is electrically connected with the external earphone microphone 3 to start a duplex transmission function, the assistant uses the external earphone microphone 3 to monitor the quality of the audio signal of the wireless microphone 1, and to assist (such as hint or prompt) the host independently through the external earphone 4. At this time, the regulation knob of the external earphone microphone volume control circuit 21 is rotated to adjust the volume to the minimum value and to form a turn-off state so that the audio signal of the external earphone microphone 3 will not be transmitted to the recording device 5.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. A wireless microphone apparatus comprising:
   a wireless microphone, a wireless receiver, an external earphone microphone, an external earphone, and a recording device;
   wherein:
   the wireless microphone includes a button control circuit and a transmission and reception circuit;
   the wireless receiver includes an external earphone microphone volume control circuit, an output port, and a reception and transmission circuit;
   the output port is electrically connected with the recording device to connect the wireless microphone with the recording device;
   the external earphone microphone is connected with the wireless receiver;
   after the output port is electrically connected with the recording device, the wireless microphone provides a sound reception function, the external earphone microphone monitors a quality of an audio signal of the wireless microphone simultaneously, and the external earphone microphone volume control circuit of the wireless receiver controls an audio signal of the external earphone microphone to be supplied to the recording device simultaneously;
   the external earphone is connected with the wireless microphone;
   the button control circuit of the wireless microphone and the wireless receiver start a duplex transmission function;
   the external earphone receives the audio signal of the external earphone microphone;
   after the external earphone is connected with the wireless microphone, and after the button control circuit of the wireless microphone and the wireless receiver start a duplex transmission function, the external earphone of the wireless microphone receives the audio signal of the external earphone microphone of the wireless receiver.

2. The wireless microphone apparatus as claimed in claim 1, wherein:
   the wireless receiver further includes a three-step noise reduction circuit, a recording volume control circuit, and an audio circuit;
   the wireless receiver receives the audio signal of the wireless microphone, and the audio signal of the wireless microphone is processed by the three-step noise reduction circuit, the recording volume control circuit, and the audio circuit, and is supplied to the recording device.

* * * * *